United States Patent [19]

Adelson et al.

[11] 4,005,786
[45] Feb. 1, 1977

[54] MECHANICAL LOAD HANDLING DEVICE FOR STOREHOUSES

[76] Inventors: Jury Abramovich Adelson, prospekt Karla Marxa, 21, kv. 57; Oleg Antonovich Tamkovich, Moskovsky prospekt, 153, kv. 141, both of Leningrad, U.S.S.R.

[22] Filed: Mar. 5, 1975

[21] Appl. No.: 555,618

[30] Foreign Application Priority Data

Mar. 6, 1974  U.S.S.R. ............................ 2003796

[52] U.S. Cl. .......................... 214/16.4 A; 214/75 G; 214/16.1 CB; 214/730
[51] Int. Cl.² ........................................ B65G 47/00
[58] Field of Search ............. 214/75 R, 75 G, 75 H, 214/16.1 CB, 16.4 A, 730; 212/124–129

[56] References Cited

UNITED STATES PATENTS

| | | | |
|---|---|---|---|
| 2,752,051 | 6/1956 | Strohm et al. | 214/16.1 CB |
| 2,826,312 | 3/1958 | Francis | 214/16.1 CB |
| 3,301,413 | 1/1967 | Coursey | 214/16.1 CB |
| 3,445,010 | 5/1969 | Alstedt et al. | 214/16.4 A |

FOREIGN PATENTS OR APPLICATIONS

| | | | |
|---|---|---|---|
| 659,557 | 5/1965 | Belgium | 214/16.1 CB |
| 1,252,821 | 6/1962 | France | 214/16.1 CB |
| 2,034,834 | 1/1972 | Germany | 214/16.4 A |
| 1,253,923 | 1/1970 | United Kingdom | 214/16.1 CB |

*Primary Examiner*—Robert J. Spar
*Assistant Examiner*—R. B. Johnson

[57] ABSTRACT

The device has a frame horizontally traversable across shelves in storehouses, and carrying columns along which transfer means are free to travel, the latter incorporating a cross-piece made up by two parallel beams bearing load supporting members are so interconnected as to form a through gap therebetween. Adjacent to the cross-piece from beneath along its entire length are guideways mounting a carriage adapted for selectively taking out and storing the load from and on the shelves.

8 Claims, 18 Drawing Figures

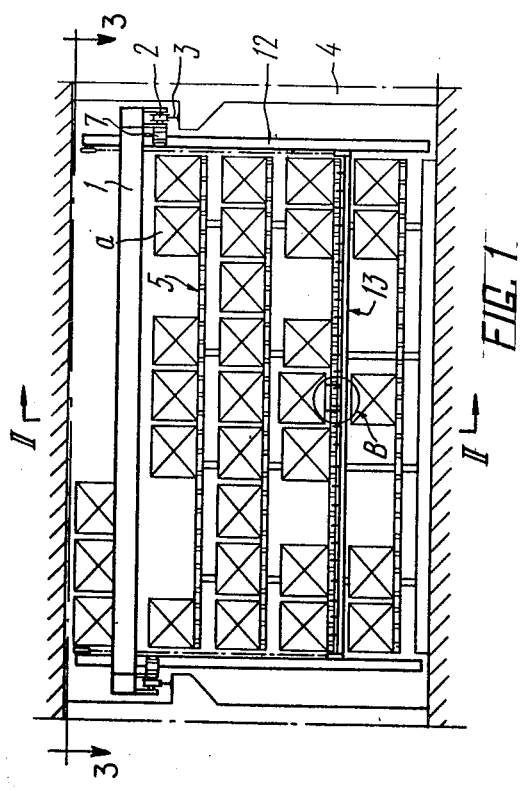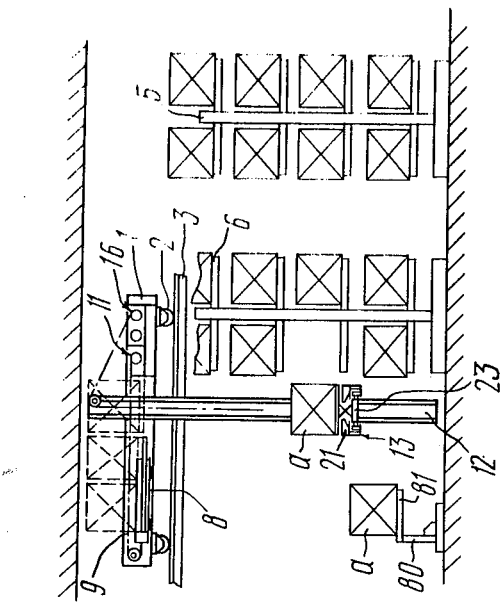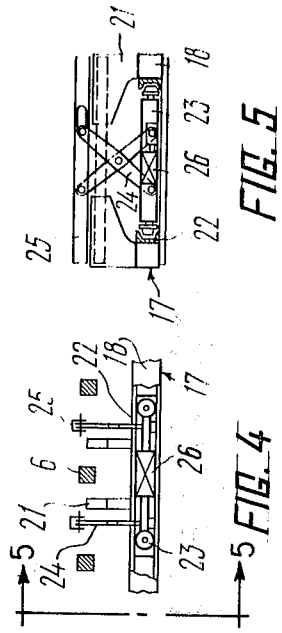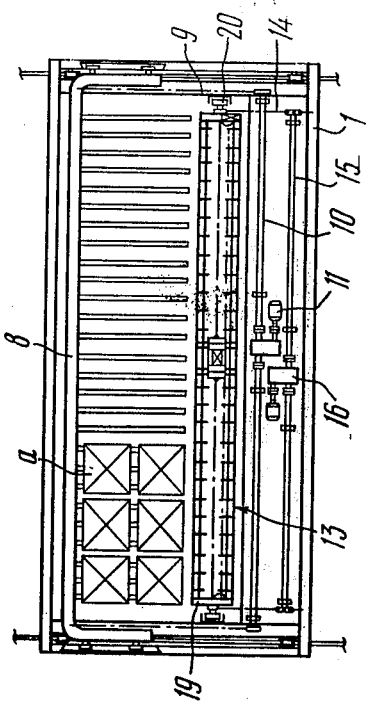

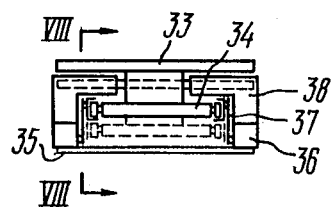
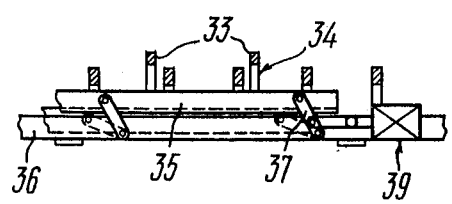
FIG. 7         FIG. 8
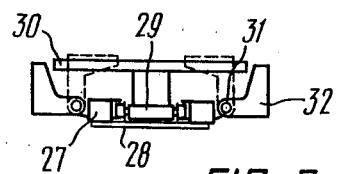
FIG. 6
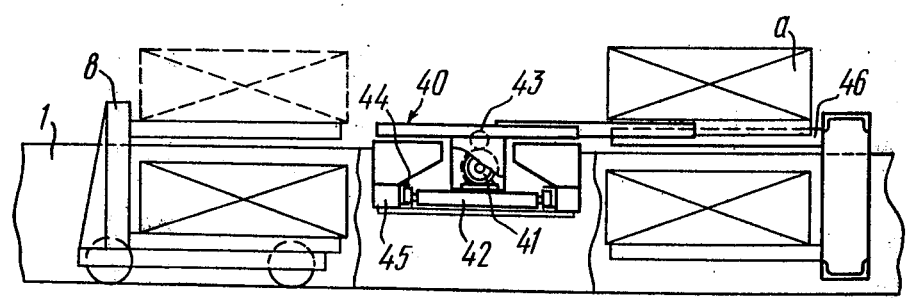
FIG. 9

MECHANICAL LOAD HANDLING DEVICE FOR STOREHOUSES

BRIEF SUMMARY OF THE INVENTION

The present invention relates generally to storage equipment or facilities, and have particular reference to mechanical load handling appliances for storehouses when piece-loads are kept on shelves with cantilevered fork racks.

According to the invention the mechanical load handler can find utility when used in storehouses where a changing assortment of loads is kept.

Known in the art are mechanical load handlers for storehouses with piece-loads kept on shelves, having cantilevered fork racks. The load handlers have a wheel-mounted frame traversable along a trackway held to the structural elements of the storebuilding. The frame carries the columns secured thereon on the lateral faces of the shelves at a distance thereto. The columns bear a load gripper which is traversable therealong. The gripper is essentially a cross-piece arranged along the shelves and provided with a number of load supporting members spaced apart from one another.

The members are substantially upright ribs forming a comb along the gripping length, adapted to interact with the fork racks of the shelf in the course of load being taken out from or placed onto the rack.

The frame along with the columns carrying the load grip is horizontally traversable across the shelves.

The above-discussed devices are adapted for palletless stowing of piece package loads in storehouses keeping similar loads, but fail to be used for a selective grouping of piece loads in storehouses with a wide diversity of load assortment.

It is an essential object of the present invention to provide such a mechanical load handling device for storehouses with piece load keeping on shelves having cantilevered fork racks, including transfer means of such a constructional arrangement that enables the device to be used not only for package stowing of piece-loads but also for selectively grouping various loads.

In keeping with these and other objects, there is proposed herein a mechanical load handling device for storehouses with piece-loads kept on shelves, having cantilevered fork racks, comprising a frame adapted to traverse horizontally across the shelves and carrying columns spaced somewhat apart from the shelves on their lateral faces, the columns mounting transfer means traversable along the latter and made as a cross-piece arranged along the shelves and carrying a plurality of load supporting members spaced somewhat apart from one another along the cross-piece, the members being adapted to interact with the fork racks of the shelves in the course of load being taken out therefrom.

According to the invention, the gripping cross-piece is made up by two beams arranged parallel to each other in the horizontal plane and so interconnected at their ends as to form a through gap therebetween, whereas the load supporting elements are fixed on the beams on both sides of the gap. Provision is made for a carriage that bears a platform adapted for taking out load from the rack of the shelf and placing the load onto the load supporting members of the cross-piece, the carriage being mounted in guideways that are adjacent to the cross-piece, so as to enable the carriage to travel along the gap in the course of selective load grouping.

It is expedient that the guideways be rigidly connected to the cross-piece beams, and the platform be connected to the carriage through a toggle-link mechanism kinematically connected to a self-contained drive and serving for vertical traversing of the platform with respect to the load supporting members.

Such an embodiment of the load gripper is expedient if it is substantially long.

It is possible that the guideways be rigidly connected to the cross-piece beams, and the platform be held in position to the carriage somewhat below the load supporting members, articulated to the corresponding beams, so as to be swung to the opposite sides of the gap somewhat below the carriage platform.

Such a constructional arrangement makes it possible to reduce the grip as for height, due to the load supporting members being swung aside, and the rigid attachment of the platform to the carriage.

It is quite practicable to rigidly hold the platform to the carriage and to connect the guideways to the cross-piece beams through a four-bar linkwork kinematically coupled to a self-contained drive to raise the guideways together with the carriage.

Such an embodiment is most reasonable with a small-length transfer means, since it does away with the provision of a platform lifting gear and a power supply means therefor.

It is rational to make the platform telescopic and associate it kinematically with a self-contained drive to extend the platform in a horizontal plane in opposite directions with respect to the gap.

Such a constructional implementation of the transfer means enables the loads to be picked off the shelf rack without introducing the entire transfer means into the shelf.

It is not less favourable to mount the carriage guideways on the columns and make them longitudinally traversable therealong with respect to the cross-piece in the course of transferring the load by the carriage from the shelf to the load supporting members that are articulated to the cross-piece beams so as to be swivelled when receiving the load. Besides, the carriage platform is expedient to be made telescopic and be associated kinematically with the self-contained drive to extend the platform in a horizontal plane in opposite directions with respect to the gap.

Such an embodiment makes it possible to render the process of selective load grouping more efficient since the loads are accumulated directly on the transfer means.

It is quite reasonable that each element of the load gripper be made as a lever with a horizontal pivot held to the beam, and that the levers of each beam be interconnected in pairs and kinematically associated with the drive, for their swivelling when gripping the load from above.

Such an embodiment of the load gripping members is recommended to be used for the sake of time saving when solid-crated loads are accumulated on the transfer means.

A mechanical load handling device according to the present invention is capable of package-stowing of piece-loads onto shelf racks, as well as handling piece-loads with a possibility of their following subsequent accumulation either on a load gripper (transfer means)

itself or on a load collector provided on the frame of the mechanical load handler.

Given below is a detailed description of a specific embodiment of the present invention with due reference to the accompanying drawings, wherein:

FIG. 1 is a front elevation of a mechanical load handling device according to the invention;

FIG. 2 is a section taken along the line II—II in FIG. 1;

FIG. 3 is a top view taken along a line 3—3 in FIG. 1;

FIG. 4 is an enlarged-scale view of a unit B in FIG. 1;

FIG. 5 is a side view taken along a line 5—5 in FIG. 4;

FIG. 6 is a cross-sectional view of another embodiment of a transfer means where load supporting members are connected to beams;

FIG. 7 shows still another embodiment of the transfer means where guideways are articulated to the beams;

FIG. 8 is a section taken along the line VIII—VIII in FIG. 7;

FIG. 9 illustrates a modified transfer means with a telescopic carriage platform;

Figure 11:
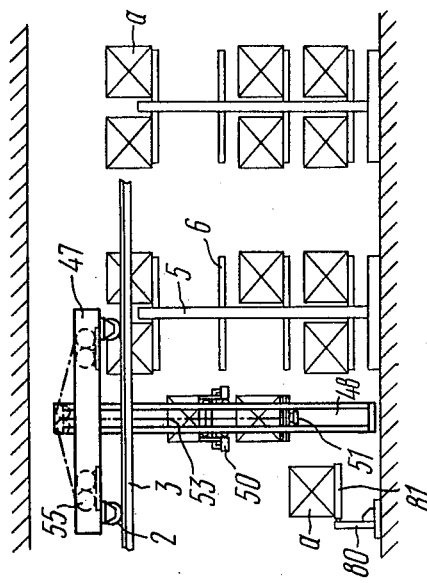
FIG. 11 is a side elevational view of FIG. 10.

Reference being now directed to the appended drawings, and particularly to FIGS. 1 through 5 thereof. The mechanical load handling device of the invention comprises a frame 1 (FIGS. 1, 2, 3) which with its running wheels 2 rests upon a trackway 3 fixed to structural elements 4 of the store-building.

The frame 1 is located above shelves 5 (FIGS. 1, 2) having cantilevered fork racks 6 (FIG. 2) and is provided with drives 7 (FIG. 1) for its horizontal traversing across the shelves 5.

For the sake of an easier handling of the frame mechanisms and higher efficiency of the load handler, the frame is preferably located under the shelves and mounted on rails laid on the floor of the storehouse.

A mechanical load handling device with such a frame is reasonably used in storehouses where the shelves are suspended from constructional members.

A fork load collector 8 (FIGS. 2, 3) is mounted on the frame 1 and connected through chains 9 (FIG. 3) and transmission shafts 10 to a drive 11 for traversing the load collector in the direction of motion of the frame 1.

Columns 12 (FIGS. 1, 2) are fixed to the frame 1 on the lateral faces of the shelves 5 at such a distance thereto that enables them to clearly pass by the end faces of the shelves 5. The columns can be made telescopic.

A load gripper or actually transfer means 13 (FIGS. 1, 2, 3) is mounted on the columns 12 with a possibility of moving therealong towards the racks 6 of the shelf 5 being loaded. The transfer means (load gripper) 13 is associated through chains 14 and transmission shafts 15, with a drive 16 mounted on the frame 1 and adapted to traverse the transfer means lengthwise the columns 12.

The transfer means 13 comprises a cross-piece 17 (FIGS. 4, 5) arranged along the shelves and composed of two beams 18 disposed in a horizontal plane parallel to each other, the ends of the beams being interconnected through cross-ties 19 (FIG. 3) carrying rolls 20. The beams 18 are so interconnected as to form a through gap therebetween. Each beam 18 carries a plurality of members 21 for bearing loads "a," these members being spaced apart to one another at a distance sufficient for the fork racks 6 of the shelves 5 to pass therebetween.

The members 21 form a comb throughout the length of the transfer means 13, the comb having a through opening in the middle portion thereof. Adjacent to the beams 18 from below are guideways 22 arranged throughout the entire length of the transfer means 13. The guideways 22 are rigidly connected to the beams 18 and mount a carriage 23 which is traversable along the gap from a self-contained drive (not shown). The drive can be of any heretofore known construction suitable for the purpose.

The carriage 23 mounts a platform 25 connected to the latter through toggle-link mechanisms 24 which are kinematically associated with a drive 26 of any known construction suitable for the purpose.

The drive imparts up and down motion to the platform 25 when taking out the piece load a (FIGS. 1, 2) from the rack 6 of the shelf 5. When in the initial position the platform 25 is allowed to drop between the members 21 as shown by the dashed lines in FIG. 5.

In another embodiment of the transfer means shown in FIG. 6, beams 27 carry guideways 28 held in position thereto and mounting a carriage 29 whereon a platform 30 is fixed in place. Drive shafts 31 are mounted on the beams 27 in parallel therewith, the shafts carrying load supporting members 32 locked in position thereon.

FIG. 6 shows the members 32 in the swung-aside position when the carriage 29 is being traversed along the gap. When in the initial position, i.e., when package stowing of loads on the shelf is carried out, the members 32 is swivelled through 90° to assume the position shown by the dashed lines in the drawing; the platform 30 in this case is located somewhat below said members.

In still another embodiment of the load gripper, illustrated in FIGS. 7 and 8, a platform 33 is fixed in position on a carriage 34, while guideways 35 are connected to beams 36 through a four-bar linkwork established by the guideways 35, the beams 36 and coupling links 37. For raising or lowering the platform 33, the links 37 are kinematically associated with a drive 39 somewhat above load supporting members 38. In this particular embodiment use is made of a solenoid-actuated drive, though no limitations are placed upon the use of any other kind of drive suitable for the purpose.

In order that the transfer means 13 need not be introduced into the shelf 5 in the course of a selective taking out of the load "a" from the rack 6 (FIG. 2) of the shelf 5, a platform 40 of a modified load gripper shown in FIG. 9, is of the three-piece telescopic type. For being extended in a horizontal plane in directions opposite to the gap, the platform has a drive 41 (FIG. 9) mounted on a carriage 42 and interconnected to the platform 40 through a rack-and-pinion gear 43. In the herein considered particular embodiment the platform 40 and the carriage 42 are rigidly interconnected, while guideways 44 are fixed in place on beams 45. Such an implementation of the transfer means is constructionally most reasonable. In the course of package stowing of loads with the transfer means 13 (FIGS. 1, 2) the carriage 42 (FIG. 9) is brought beyond the length of the shelf 5 (FIGS. 1, 2).

For the sake of higher efficiency of the present mechanical load handler, the load collector 8 is made double-tiered as shown in the left-hand part of the drawing of FIG. 9. A stationary, fixed load collector 46 can also be provided on the frame 1.

Figure 10:
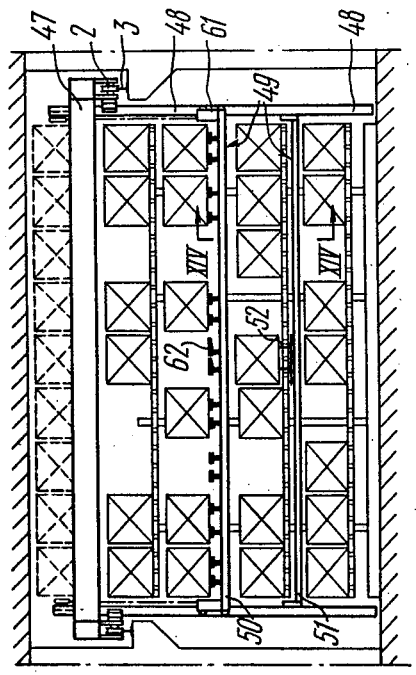
FIG. 10 is a front elevation of another embodiment of a mechanical load handling device according to the invention.
Figure 12:
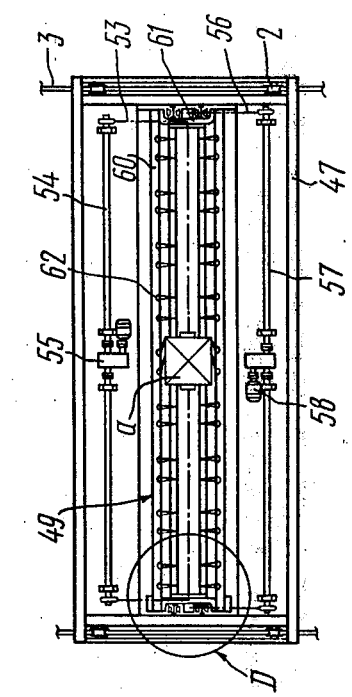
FIG. 12 is a plan view of FIG. 10.

In another embodiment the mechanical load handling device, illustrated in FIGS. 10, 11, 12, of the invention comprises a frame 47 made substantially similar to the frame 1 disclosed hereinbefore. Columns 48 made fast on the frame 47 are likewise similar to the columns 12 considered hereinabove. The columns 48 mount a transfer means 49 comprising a cross-piece 50 and guideways 51 adjacent thereto from below and mounting a carriage 52 (FIG. 10).

Figure 13:
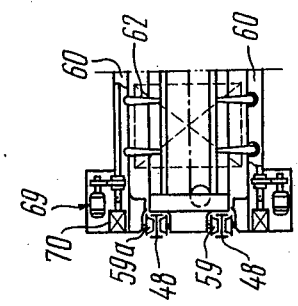
FIG. 13 is an enlarged-scale view of a unit D in FIG. 12.

The cross-piece 50 (FIGS. 10, 11) is connected through a chain 53 (FIG. 12) and a transmission shaft 54 to a drive 55 wherefrom it receives lengthwise motion along the columns 48. The guideways 51 (FIGS. 10, 11) are independently movable along the columns 48 from a drive 58 through a chain 56 (FIG. 12) and a transmission shaft 57. The end faces of the guideways 51 mount rolls 59 (FIG. 13) traversable along their own ways mounted on the columns 48.

The cross-piece 50 (FIG. 11) is established by two beams 60 (FIG. 13) arranged parallel to each other in a horizontal plane. The ends of said beams are interconnected through U-shaped cross-ties 61 (FIGS. 10, 12) carrying rolls 59a (FIG. 13) traversable along their own ways also provided on the columns 48.

Figure 14:
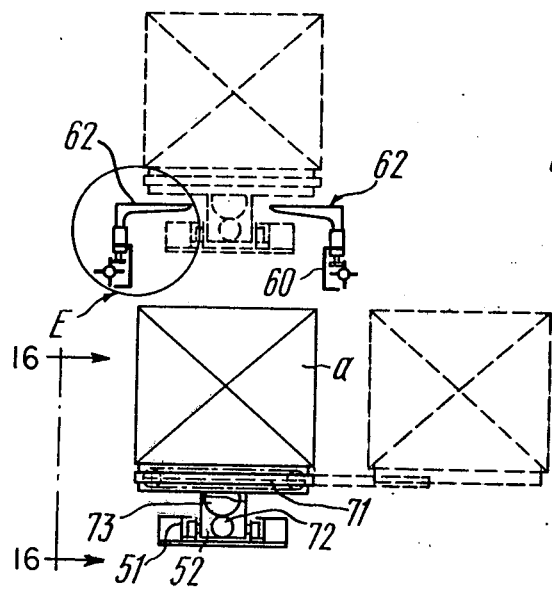
FIG. 14 is a section taken along the line XIV—XIV in FIG. 10.

Beams 60 are so interconnected as to form a through gap therebetween, wherein the carriage 52 (FIG. 14) is accommodated when the cross-piece 50 and the guideways 51 are brought together.

Each beam 60 mounts a plurality of load supporting members 62 arranged in a row to form a comb over the load gripper length.

Figure 15:
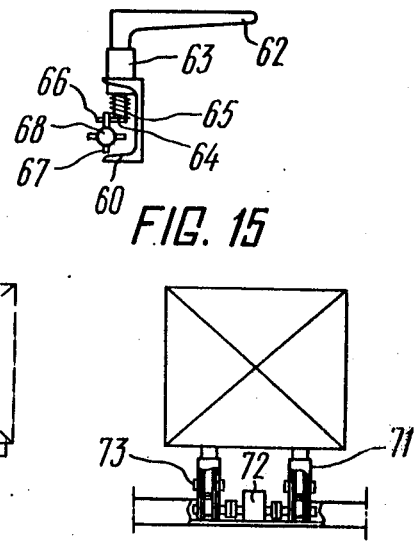
FIG. 15 is an enlarged-scale view of a unit E in FIG. 14.

The members 62 are articulated to the beams 60 so as to be turned through an angle approximately equal to 90°, whereby the gap gets fully open for the carriage 52 with the load $a$ to pass. The articulated joint of the members 62 with the beams 60 comprises a sleeve 63 (FIG. 15) and an upright shaft 64 running therethrough, a return spring 65 and a lever 66 being fitted on said shaft. The top end of the shaft 64 is rigidly coupled to the member 62.

When the members are being swivelled the levers 66 interact with rods 67 radially mounted on bars 68 interconnected to a drive 69 (FIG. 13) which turns the latter and to a drive 70 to impart reciprocating motion thereto. The members 62 are clustered together at the places where the loads are received from the carriage 52 so as to be swivelled at a time.

The rods 67 (FIG. 15) are held in position on the bars 68. A definite angle of setting of the rods 67 round the diameter of the bars 68 corresponds to each of the clusters of the members 62. To swivel the cluster of the members 62, the rods 67 are set upright at the place where the load $a$ is received from the carriage 52, these rods being adapted to interact with the levers 66 of the members when the bars 68 are being reciprocated from the drive 70.

The carriage 52 is traversable along the gap from a self-contained drive (not shown), which can be of any heretofore known construction suitable for the purpose.

Figure 16:
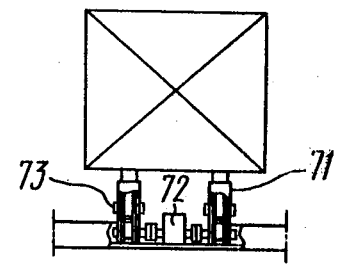
FIG. 16 is a side view along a line 16—16 in FIG. 14.

A three-piece telescopic platform 71 (FIGS. 14, 16) is fixed on the carriage 52. To extend the platform in a horizontal plane in opposite directions from the gap towards the racks 6 (FIG. 11) of the shelves 5, provision is made for a drive 72 (FIGS. 14, 16) mounted on the carriage 52 and mechanically associated with the platform through a rack-and-pinion gear 73.

In case of package stowing of loads the guideways 51 together with the carriage 52 contact the beams 60 for the entire transfer means to be introduced into the shelf 5 (FIG. 11).

Figure 17:
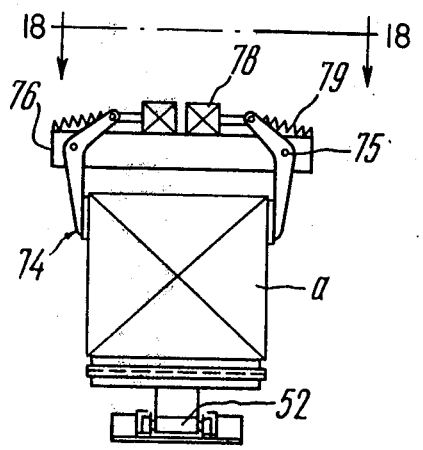
FIG. 17 shows yet another transfer means with levers interconnected in pairs.
Figure 18:
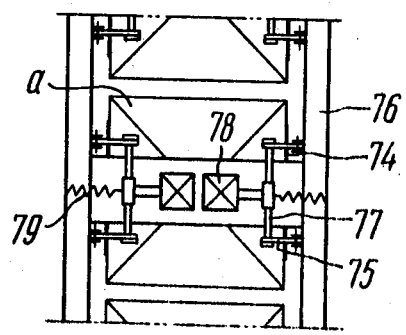
FIG. 18 is a top view taken along a line 18—18 in FIG. 17.

In yet another embodiment of the transfer means, shown in FIGS. 17, 18, each of load supporting members 74 is essentially a lever with a horizontal pivot 75 locked in position on a beam 76. The levers 74 are interconnected in pairs through stems 77. Each stem 77 is connected to a respective drive 78 which imparts swivelling motion to the levers 74.

In the given particular embodiment use is made of a solenoid-actuated drive, though resort can be made to any drive suitable for the purpose.

To develop an adequate force of load gripping by the levers 74, the beams 76 carry springs 79 connected to the stems 77.

The mechanical load handling device of the invention operates as follows. In case of package stowing of the loads $a$, a package of the similar loads $a$ is formed on a table 80 (FIG. 2) which is essentially a live roller bed with overhung rollers 81. Loads delivered to the storehouse are collected on the table and positioned snugly to one another over the entire length of the rack 6 of the shelf 5.

The platform 25 moves down somewhat below the members 21, whereupon the transfer means 13 is introduced under the table 80 and, upon being raised a little, takes out the loads therefrom. Then the rollers 81 get fully lowered into the spaces between the members 21 which owing to this take out the loads from the rollers 81. The transfer means 13 with the loads is brought from under the table 80. The drive 16 is turned in, the load gripper is raised to its topmost position and set within the frame 1 which has a through gap for the purpose. Upon putting the drives 7 into operation the frame 1 with the transfer means 13 in the topmost position is traversed to the required shelf 5.

The transfer means 13 with the loads is moved down into the aisle between the shelves 5, stops against the rack 6 to be charged and is then introduced into the shelf 5 in such a manner that the beams 18 pass under the rack 6 of the shelf 5 which is sunk between the members 21. The transfer means 13 is lowered a little, and the loads are left on the rack 6 of the shelf 5. The empty transfer means 13 is brought out of the shelf 5 into the aisle, raised into the outlines of the frame 1 and returned to the table 80 for the next load package. In order to take out a load package from the racks 6 of the shelf 5, the stowage procedure should be reversed. Loads can be placed onto the table 80 or another table of a similar construction provided in any place of the storehouse.

In another embodiments of the present mechanical load handling device their operation, in case of package stowing of loads, is similar to that described hereinbefore. The transfer means carriage in this case is not involved in the operation and its platform, adapted for a selective load take-out, is disposed somewhat below the load supporting members.

To provide higher efficiency in package stowing of loads, use can be made of the fork load collector 8.

Packages of loads picked off by the transfer means 13 from the table 80 are laid onto the collector successively in two horizontal rows in the following way. The gripper 13 raises the package of loads taken from the table 80 into the outlines of the frame 1. The drive 11 is started and the load collector is moved towards the transfer means 13. The forks of the collector 8 pass under the loads between the members 21 so that upon lowering the transfer means 13 the loads are left on the collector 8. In a similar way another load package is laid onto the collector 8, while the third package remains on the transfer means. The loads are taken out from the collector 8 and stowed in the shelves 5 in a way similar to that described above.

In the modified embodiment of the device provided with a telescopic platform illustrated in FIG. 9, only the fork load collector 8 is made use of in case of package stowing of loads, while the stationary load collector 46 is left beyond application.

When applied for a selective load grouping the present mechanical load handler operates as follows.

Some diversified loads are accumulated on the table 80 over the entire length of the transfer means spaced apart from one another at distances sufficient for a selective load being taken out by the carriage 23. Packages of the loads *a* are picked off by the transfer means 13 from the table 80 and charged onto the load collector 8. Then the drives 7 of the frame 1 are put into operation to traverse the latter horizontally with the transfer means 13 in the topmost position, towards the required aisle between the shelves 5.

Upon getting into the aisle between the shelves 5 the transfer means 13 is moved down somewhat below the collector 8 which is somewhat shifted to place the load package under the transfer means 13. The carriage is traversed along the guideways 22 along the gap to stand under the load in the collector 8 to be taken out therefrom and placed onto the rack 6 of the shelf 5. The platform 25 of the carriage 23 is raised a little above the members 21 by virtue of the toggle-link mechanism 24 so as to be traversed along the transfer means 13.

Once the platform 25 has been set under the loads, the transfer means 13 is raised a little, and the platform 25 takes out the load from the collector 8 which is then returned to the initial position, thus giving access for the transfer means 13 to the subjacent racks 6 of the shelf 5. The transfer means 13 carrying the load moves down to get at the level of the rack 6 being charged, the carriage 23 with the load is moved along the gap and stops against the vacant place on the rack 6 of the shelf 5. Then the transfer means 13 is introduced into the shelf 5 and the load *a* is lowered onto the fork rack 6 due to the subsequent downward motion of the platform 25. Proceeding in a similar way the transfer means 13 takes out in succession the remaining loads *a* from the collector 8 and stows them in the shelves 5. The reversed sequence of operations occurs when taking the loads from the racks 6 of the shelves 5.

In another embodiment of the load gripper illustrated in FIG. 6, featuring a rigid attachment of the guideways 28 on the beams 27 and of the platform 30 on the carriage 29, the latter is moved along the gap and the platform 30 and takes out the loads *a* from the rack 6 of the shelf 5 after the drive shafts 31 with the members 32 have turned appropriately.

As a result of swinging the members 32 aside the platform 30 assumes a position somewhat above said members. Taking the loads out from and placing them onto the racks 6 of the shelves 5 occur in a way similar to that described above.

In still another embodiment of the transfer means shown in FIGS. 7, 8 the platform 33 of the carriage 34 is extended for the load to take out somewhat above the members 38, upon raising the guideways 35 effected due to swivelling of the links 37 of the four-bar linkwork from the drive 39.

In the modified embodiment of the carriage 42 (FIG. 9) with the telescopic platform 40, the loads are taken out from and placed onto the rack 6 of the shelf 5 by virtue of the platform 40 extended either side of the gap. The load collector 8 may be immovable in case of a selective load grouping.

In another embodiment of the mechanical load handling device of the invention shown in FIGS. 10 to 16, the selective load grouping operation occurs as follows.

The package of diversified loads is collected on the table 80 in a way similar to that described above. The transfer means (load gripper) 49 is moved down towards the table 80 and stops above its level. The guideways 51 with the carriage 52 are moved down from the drive 58 to get below the level of the table 80. The carriage 52 is traversed along the gap towards the place of the load positioning onto the members 62 which are swivelled to leave the gap for the load *a* to pass. Then the drive 58 is put in operation, and the guideways are broguht in contact with the cross-piece 50.

The result is that the platform 71 with the loads passes through the gap between the beams 60 and is positioned somewhat above the cluster of the swivelled members 62. Then the latter are returned into the initial position by the springs 65 after the drive 72 has been turned out, so as to be set under the load *a* situated on the platform 71. Upon lowering the guideways 51 the load is left on the members 62.

Thus, the transfer load (load gripper) 49 is filled with loads. Upon collecting the load package the cross-piece 50 together with the guide-ways 51 locked-in therewith and the carriage 52 is raised to assume the position within the outlines of the frame 47, while the gripper 49 is traversed towards the required shelf. The loads *a* are taken out from the members 62 by the carriage 52 and placed onto the shelf rack in an order reversing that described above. The load taking out from the shelves and placing them onto the gripper 49 are similar.

Whenever the efficiency of the present device need be increased a load collector can be provided on the frame 47. In this case, both in package stowing of loads and in load selective grouping, it is only the cross-piece 50 with the members 62 that interacts with the load collector.

In yet another embodiment of the transfer load (load gripper) (FIGS. 17, 18) the device functions substantially in a way similar to that with the embodiment of the load gripper 49 as shown in FIGS. 10 to 16.

When receiving the loads from the carriage 52, the drives 78 actuating the levers 74, are put into operation to swivel said levers to the opposite sides with respect to the gap.

Load gripping is effected by holding them from above with the levers 74 when the latter are turned by the springs 79.

In the description of the various embodiments of the present invention disclosed above, specific narrow terminology has been resorted to for the sake of clarity. It should be understood, however, that the present invention is in no way limited to the terms so selected and that each such term covers all equivalent elements operating in a similar manner and employed for solving similar problems.

Though this invention has been described herein with reference to preferred exemplary embodiments thereof, it will be understood that minor changes in the details of construction may be made without departing from the spirit and scope of the invention, as will be readily understood by those skilled in the art.

All these alterations and changes will be considered to remain within the limits of the spirit and scope of the invention.

What we claim is:

1. A mechanical load handling device for storehouses, for keeping loads on shelves (5) with cantilevered fork racks (6), for taking out the loads from the shelves and for storing them thereon, the device comprising: a frame (1, 47) for horizontal traversing across the shelves; columns (12, 48) made fast on said frame on the opposite lateral faces of the shelves at a distance thereto; transfer means (13, 49) mounted on said columns traversably therealong and incorporating: a cross-piece (17, 50) disposed between said columns along the shelves and made up by two beams (18, 27, 36, 45, 60, 76) arranged parallel to each other in a substantially horizontal plane and so interconnected at their ends as to form a through gap therebetween; a plurality of load supporting members (21, 32, 38, 62, 74) spaced somewhat apart from one another on said beams throughout the length thereof to interact with the fork racks of the shelves in the course of taking out the loads; a carriage (23, 29, 34, 42, 52) mounting a platform (25, 30, 33, 40, 71) for selective taking out of the loads from and storing them on the fork racks; and guideways (22, 28, 35, 44, 51) adjacent to said cross-piece and serving for said carriage to traverse therealong, said guideways being so mounted that said carriage is traversable lengthwise of said gap.

2. The load handling device as defined in claim 1, wherein said guideways (22, 28, 35, 44, 51) are disposed in said gap between the beams (18, 27, 36, 45, 60, 76) and in parallel thereto; said guideways being mounted so as to be capable of moving in the direction of motion of said transfer means (13, 49); said carriage (23, 29, 34, 42, 52) being mounted in said guideways for carrying said platform (25, 30, 33, 40, 71); and means for moving said carriage along said guideways.

3. The load handling device as defined in claim 2, wherein said guideways (22) are rigidly connected to said beams (18), and said platform (25) is connected to said carriage (23) through a toggle-link mechanism (24) kinematically associated with a self-contained drive (26) and serving for vertical traversing of said platform with respect to said supporting members (21).

4. The load handling device as defined in claim 2, wherein said platform (33) is rigidly held to said carriage (34), and said guideways (35) are articulated to said beams (36) through a four-bar linkage (35, 36, 37) kinematically associated with a self-contained drive (39) so as to raise said guideways together with said carriage.

5. The load handling device as defined in claim 2, wherein said platform (40) is kinematically associated with a self-contained dirve (41) so as to be extended in the horizontal plane in opposite directions with respect to said gap.

6. The load handling device as defined in claim 2, wherein said guideways (51) are mounted on said columns (48) and made longitudinally traversable therealong with respect to said cross-piece (50), when the load is being transferred by said carriage (52) from the shelves (5) to said supporting members (62), which latter are articulated to said beams (60, 76) so as to be swivelled when receiving the load, said platform (71) being made telescopic and kinematically associated with a self-contained drive (72, 78) to extend said platform in the horizontal plane in opposite directions with respect to said gap.

7. The load handling device as claimed in claim 6, wherein portions of said transfer means (13) essentially constitute levers (74) with horizontal pivots (75) held to said beams (76), and said levers of each beam are interconnected in pairs and kinematically associated with said drive (78) for being swivelled when gripping the load from above.

8. The load handling device as defined in claim 2, wherein said supporting members (32) are articulated to said beams (27), so as to be swung between a lower position at opposite sides of said gap and an upper position somewhat below said platform, said guideways (28) are rigidly connected to said beams, and said platform (30) is held in position on said carriage (29) somewhat below said supporting members when in the upper position.

* * * * *